United States Patent [19]
Ishida et al.

[11] Patent Number: 4,772,912
[45] Date of Patent: * Sep. 20, 1988

[54] TEMPERATURE COMPENSATION DEVICE FOR FOCUS DETECTING DEVICE

[75] Inventors: Tokuji Ishida, Osaka; Masataka Hamada, Minamikawachi, both of Japan

[73] Assignee: Minolta Camera Kabushiki Kaisha, Osaka, Japan

[ * ] Notice: The portion of the term of this patent subsequent to Mar. 7, 2004 has been disclaimed.

[21] Appl. No.: 25,498

[22] Filed: Mar. 13, 1987

Related U.S. Application Data

[62] Division of Ser. No. 731,453, May 6, 1985.

[30] Foreign Application Priority Data

May 8, 1984 [JP] Japan ................................ 59-91670

[51] Int. Cl.⁴ .............................................. G03B 3/00
[52] U.S. Cl. .................................... 354/402; 354/408; 250/204
[58] Field of Search ............... 354/400, 402, 403, 408; 250/204, 216

[56] References Cited

U.S. PATENT DOCUMENTS

| | | | |
|---|---|---|---|
| 4,377,742 | 3/1983 | Kawabata et al. | 250/204 |
| 4,419,574 | 12/1983 | Kawabata et al. | 250/216 |
| 4,479,706 | 10/1984 | Takahashi | 354/403 |
| 4,533,227 | 8/1985 | Takahashi | 354/403 |
| 4,650,309 | 3/1987 | Ishida et al. | 354/402 |

Primary Examiner—Russell E. Adams
Attorney, Agent, or Firm—Price, Gess & Ubell

[57] ABSTRACT

Present invention relates to a phase difference detection type focus detecting device which includes a pair of image forming lenses and a photo sensor array and detects the focus deviation in accordance with the positions of a pair of formed images respectively formed on the photo sensor array by the pair of image forming lenses. In such focus detecting device, the pair of image forming lenses are integrally molded of a plastic material, such that the change of the distance between the pair of image forming lenses due to the temperature change causes the error of the focus deviation. The error is made to zero by the detection of the ambient temperature and the compensation of the data basing on expansion or contraction of the plastic material with temperature.

11 Claims, 10 Drawing Sheets

TEMPERATURE COMPENSATION DEVICE FOR FOCUS DETECTING DEVICE

This is a division of application Ser. No. 731,453, filed May 6, 1985.

BACKGROUND OF THE INVENTION

1. Field of the Invention

The present invention relates to a camera focus detecting device which detects the focus condition of the objective lens basing on the light coming from an object to be photographed and passing through the different portions of the objective lens. In particular, the invention relates to such a focus detecting device having an optical construction including a pair of image forming lenses for respectively forming an image of the object and a photo sensor array for receiving the two images and generating signals representative of the positions of the formed images for the focus detection.

2. Description of the Prior Art

The focus detecting device having the optical construction as mentioned above has been known in the art as seen, for example, in a Japanese laid-open patent application Tokkai Sho 58-150918. The optical construction of the device is schematically shown in FIG. 1. With reference to FIG. 1, the primary image 28 of an object formed by an objective lens 2 is re-imaged or re-formed by a pair of image-forming lenses 10 and 12 to be a pair of images 30 and 32 (or 34 and 36 or 38 and 40) formed of the light passing through the different portions of the objective lens 2. The pair of image-forming lenses 10 and 12 are disposed at positions conjugate with the exit pupil of the objective lens 2 with respect to a condenser or relay lens 6. In the case of re-imaging, the distance between the re-formed images 30 and 32 (or 34 and 36 or 38 and 40) changes depending on whether the primary image is formed in front of a predetermined focal plane 22 (front focus), exactly on the predetermined focal plane 22 (in-focus) or behind the predetermined focal plane 22 (rear focus). The focus detecting device has a photo sensor array disposed on a given plane 20 in the vicinity of the re-image plane such that the photo sensor array detects the distance between the re-formed images. The detected image distance is compared with the standard image distance, i.e. the distance between the re-formed images at in-focus condition, to calculate the difference between the detected and standard distance, i.e. the amount of deviation of the image distance. From the calculated amount is determined an amount of the deviation of the focusing, i.e. the distance or interval between the predetermined focal plane and the image position where the primary image 28 of the object is formed by the objective lens 2. Although the principle of detecting the amount of the focus deviation will be explained later on, the re-formed imaged are at the positions 30 and 32 in the in-focus condition, at the positions 34 and 36 in the front focus condition and at the positions 38 and 40 in the rear focus condition. The above described focus detecting system is referred to as phase difference detection type system or shortly as phase difference type hereinafter for the convenience of description.

When the optical system for the detection of phase difference including a condenser lens 6, a pair of image-forming or re-imaging lenses 10 and 12 and photo sensor array, is incorporated or housed within the camera body (for example under the bottom of the mirror box) of a single lens reflex camera, it is convenient if the pair of re-imaging lenses are made of plastic material integrally with each other and the optical system is formed into a compact module. However, plastic material generally has a linear expansion coefficient that is three to four digits larger than that of glass material. The acrylic resin, for example, has the coefficient of expansion of $6 \times 10^{-5}/°$ C. Thus, if a plastic material is employed for an optical component of a camera, the expansion or contraction of the plastic with temperature is not negligible with respect to the effect on the result of a focus detection. In other words, when the pair of image forming lenses are integrally molded of plastic material, the distance between the lenses changes with the ambient temperature, i.e. the temperature in the circumstance of the camera. For example, if the distance between a pair of integrally molded lenses is 1.1 mm at a certain temperature as shown in FIG. 4, the distance will increase by a 2 $\mu$m with the raise of temperature by 30° C. If the amount of the change of the lens distance is converted into the amount of deviation of the image formed by the objective lens 2 from the predetermined focal plane 22, the value will be as large as 85 $\mu$m. It should be noted that cameras are usually used in the ambient temperature ranging from $-20°$ C. to $+40°$ C. or more. Additionally, single lens reflex cameras are generally required to have the high accuracy of focus detection of about $\pm 50$ $\mu$m. Accordingly, if no countermeasure or compensation is adopted for the expansion or contraction of the plastic material due to the temperature change, the focus detection is affected by temperature and will provide incorrect indication, such as to indicate front or rear focus for the case when the image of an object is formed on the predetermined focal plane, i.e. for the infocus condition. In other words, accurate result of focus detection can not be obtained with the plastic lenses under different temperature condition, the pair of integrally molded plastic lenses could not be employed for the focus detecting device for use in a single lens reflex camera for which a high accuracy is required.

SUMMARY OF THE INVENTION

An object of the present invention is to provide a focus detecting device of the above mentioned phase difference detection type wherein the optical system thereof is compact in size.

Another object of the present invention is to provide the focus detecting device which is not affected by the ambient temperature.

A further object of the present invention is to provide the focus detecting device wherein a pair of image forming lenses are integrally molded of plastic material but highly accurate focus detection is always guaranteed even if the ambient temperature changes. Still a further object of the present invention is to provide the focus detecting device wherein electrical compensation is adopted to cope with the problem due to the expansion or contraction of plastic material with temperature.

In the phase difference detection type focus detecting device according to the present invention, a pair of image forming lenses which are integrally molded of plastic material and which form two images. The amount of the deviation of focus is detected in accordance with the signals representing the positions of the images. The focus detecting device comprises a data compensating device which compensates, in accordance with the ambient temperature, for the change of the deviation of the focusing due to the expansion or contraction of the distance between the image forming lenses with the temperature. Accordingly, the inconvenience that the amount of focus deviation varies with the temperature, is eliminated and accurate focus detection is always effected irrespective of the temperature change.

According to the preferred embodiment, the data for use in detecting the amount of foucs deviation or the data representing the detected value, e.g. the data of the image distance, the data of the deviation of the image distance, and the deviation of the focusing are changed for the compensation in accordance with the temperature.

Other objects and advantages of the invention will become apparent during the following discussion of the accompanying drawings, wherein:

DETAILED DESCRIPTION OF THE PREFERRED EMBODIMENT

At the outset, explanation will be made about the principle of detecting the amount of focus deviation in the above mentioned phase difference type focus detecting device, with reference to FIG. 2, which shows relative positional relationship between the photo sensor array 42 and the images formed by a pair of lenses at the time of front focus, infocus and rear focus respectively. (Such images will be referred to as re-formed images hereinafter.) The photo sensor array 42 comprises a CCD (Charge Coupled Device) photoelectrical converter which includes a large number of photodiode cells arranged in a line. In the embodiment, the pair of image forming lenses have substantially same optical characteristics and the focal planes of the lenses lie in the same plane on which the photodiode cells are arranged side-by-side so that the image forming lenses form the re-formed images on the photodiode array at the positions above and below the optical axis 4 as seen in the FIG. The distance between the re-formed images is detected by the comparison of the reference image with the standard image. The image, e.g. 30 re-formed on the portion of the photodiode array above the optical axis is determined as the standard image, while the image, e.g. 32 formed on the portion of the photodiode array below the optical axis is determined as the reference image. The amount of the focus deviation is detected in accordance with the distance between the reformed images. The position of the standard image 30 is detected by sixteen photodiode cells L1 through L16 arranged above the optical axis. The position of the reference image 32 is detected by photodiode cells R1 to R32 of which number e.g. 32 is larger than that of the photodiode cells for the detection of the standard image. It is to be noted that the numbers of the photodiode cells are not limited to the values as mentioned above but may be increased or reduced in accordance with the requirement in the design.

Figure 1:
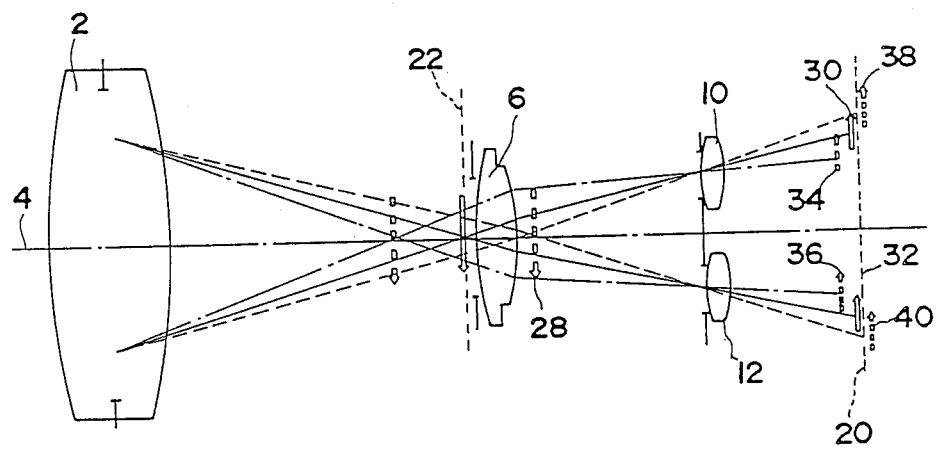
FIGS. 1 and 2 are schematic illustrations showing the principle of the phase difference detection type focus detecting device.
Figure 2:
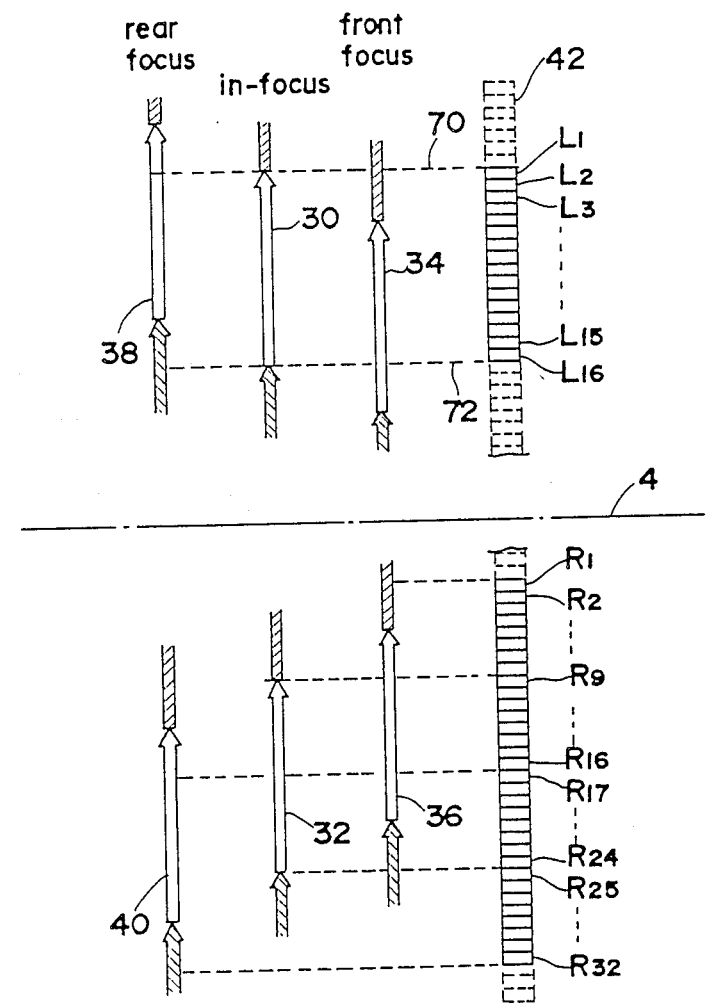
Figure 3:
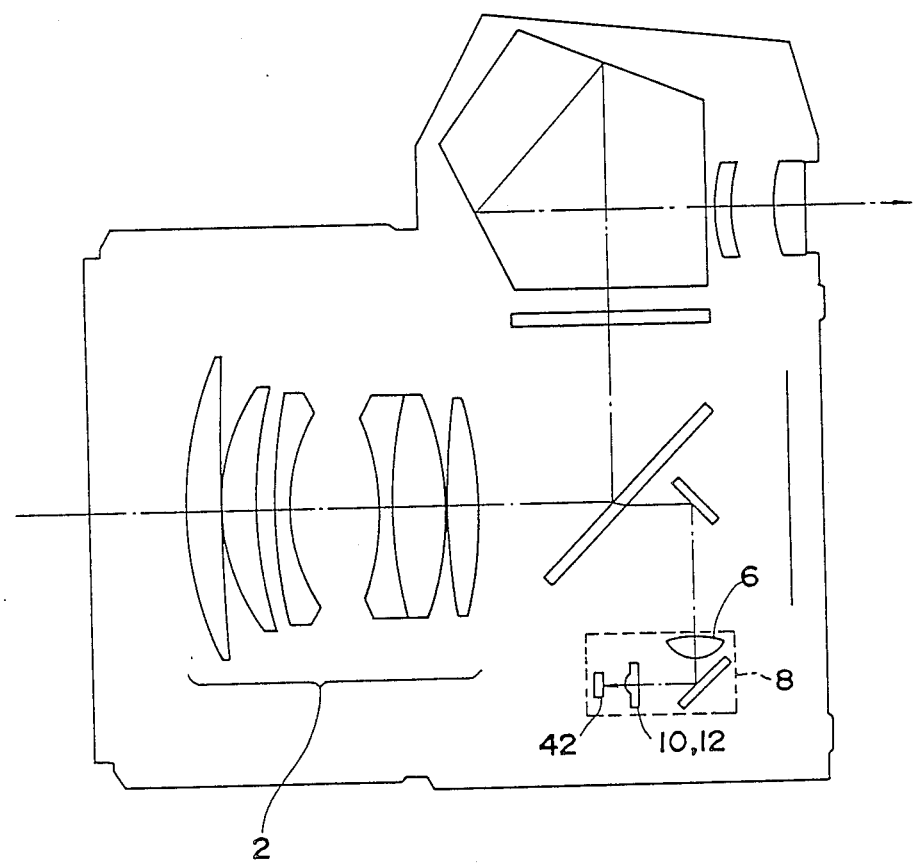
FIG. 3 is a schematic cross sectional view of a single lens reflex camera showing the optical components of the focus detecting device disposed within the camera body.

In FIG. 2, the blank or hollow arrow marks 30, 32, 34, 36, 38 and 40 above and below the optical axis, represent the standard image and its corresponding reference image which are formed on the photo sensor array 42. The portions of hatched arrow marks shown above and below the blank arrows represent the re-formed images adjoining to the standard or reference image. On the photodiodes L1 through L16 is projected the reformed image extending within the to-be-detected range between two broken lines 70 and 72 as seen in FIG. In the case of out-of-focus condition, i.e. the front focus or rear focus condition, a portion of the image represented by the blank arrow extends outside of the to-be-detected range and a portion of the image represented by the hatched arrow is detected within the range in place of the blank arrow image. The amounts of light respectively received by photodiode cells L1 through L16 and R1 through R32 are converted into electrical signals which in turn are successively output as the outputs of the CCD and are processed.

Now, let's assume that the focus detecting system is arranged such that the standard image on the upper photodiode cells L1 through L16 coincides with the reference image on the lower photodiode cells R9 through R24 at a given ambient temperature, e.g. 25° C. when the primary image of an object is formed on the predetermined focal plane, i.e. on the film plane by the objective lens 2. When the numbers of the photodiode cells are determined as shown in FIG. 2, the standard image is compared with the reference image in seventeen ways. If the electric signals commensurate with the amounts of light received by photodiode cells L1 through L16 and R1 through R32 are represented respecttively by the same caharacters L1 through L16 and R1 through R32, the signal H(1) representing the result of the first comparison is shown as follows as the comparisons of the signals L1 through L16 and the signals R1 through R16:

$$H(1) = |L1 - R1| + |L2 - R2| + \ldots + |L16 - R16|$$
$$= \sum_{i=1}^{16} |Li - Ri|$$

The signal H(2) representing the results of the second comparison is shown as follows as the respective comparisons between the sginals L1 through L16 and R2 through R17:

$$H(1) = |L1 - R2| + |L2 - R3| + \ldots + |L16 - R17|$$
$$= \sum_{i=1}^{16} |Li - Ri + 1|$$

The signals representing the subsequent comparisons are shown in the same way and the signal H(17) representing the seventeenth comparison is shown as follows as the respective comparisons of the signals between the signals L1 throug L16 and the signals R17 through R32:

$$H(1) = |L1 - R17| + |L2 - R18| + \ldots + |L16 - R32|$$
$$= \sum_{i=1}^{16} |Li - Ri + 16|$$

After those comparisons, the ordinal number of the comparison that presents the minimum value is found from the results of the seventeen comparisons. If the upper and lower images are equal to each other in the shape and brightness distribution, and if the light responsive characteristics of the photodiode cells are equal to one another, the minimum value given as the result of the comparsion of coinciding images will be zero. In FIG. 2, the signal H(1) representing the first comparision will be zero if the images are in the relative positions as shown by 34 and 36. In the case of relative positions of the images 30 and 32, the signal H(9) representing the result of the ninth comparison will be zero. In the case of the relative positions of the images 38 and 40, the signal H(17) representing the result of the seventeenth comparison will be zero. It should be noted that the minimum value of the comparison results will not always be zero because it may occur a case wherein the two images come closer to each other by a half of the pitch of the photodiode cells. Additionally the shapes and brightness distributions of the two images are not exactly coincident with each other. The minimum value will not be zero also in terms of this fact. Thus, the ordinal number of the comparison that shows the minimum value is treated or regarded as to show the highest degree of coincidence of images. From the above described comparing operation, seventeen times of focus detections are effected.

Figure 4:
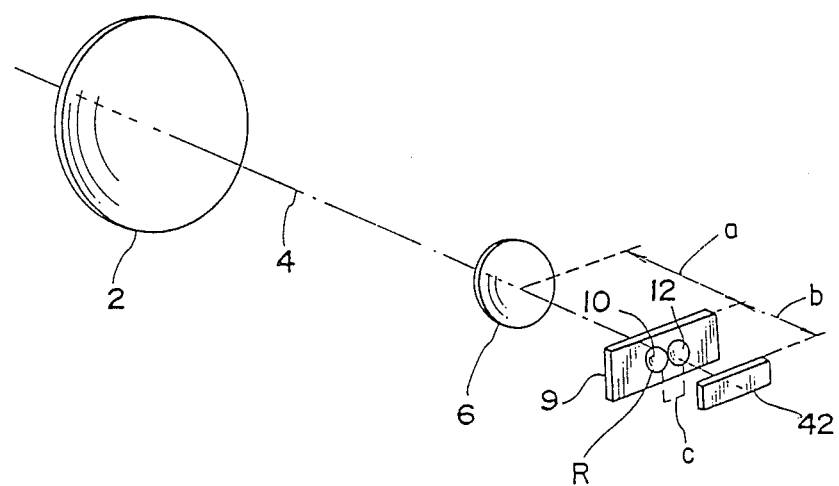
FIG. 4 shows the shapes and arrangement of the optical components of the focus detecting device according to the present invention.

When the focus detecting optical system has the dimensions as shown in FIG. 4, e.g., a 10 mm, b=3.3 mm, C-1.1 mm and the photodiode cells in CCD are arranged at the pitch of 20 μm, the deviation or shift by one pitch in the identification of the ordinal number of the comparison of the highest coincidence will be converted into the change by about 1 mm in the amount of deviation or shift of the primary image from the film plane. As described before, single lens reflex cameras are required to provide the accuracy of focus detection of about ±50 μm in terms of the deviation of a primary image so that the coincidence of images is required to be detected with the resolution to discriminate the changes smaller than the pitch of the photocells. The process of and device for such detection of high resolution are disclosed in detail in U.S. patent application Ser. No. 570,012 filed Jan. 10, 1984 and it seems unnecessary to discuss the same and will not be described further herein because such process and device have little concern with the present invention.

The detection of the deviation of the focus is effected in the following manner when the effect of the ambient temperature is not taken into account. It is assumed that the output of each photodiode cell in the CCD is derived in a known manner, converted into a digital signal and stored in a predetermined memory. Then, the aforementioned operation to compare the standard image with the reference image is performed to detect the ordinal number N of the comparison showing the minimum value of the electric signal. The definite value of N will be from 1.000 to 17.000 if it is to be calculate down to three places of decimals. The manner and process to obtain the values of decimals are also disclosed in the aforementioned U.S. Patent application and will not be described further herein because they have no direct concern with the present invention. Now, let Ns shows the standard value of the ordinal number N for the in-focus condition. In the case of FIG. 2, Ns=9.000. It is to be noted that, in practice, the value of Ns must be adjusted from the planned value to compensate for the error in manufacture. When the value of N has been obtained, the amount ΔN of the deviation of the actual image distance from the image distance at the time of in focus condition is then obtained through the calculation shown by the following formula:

$$\Delta N = N - Ns \quad (1)$$

The following relationship should hold between the amount aΔof the image distance deviation and the amount d1 of the focus deviation:

$$d1 = a1 \cdot \Delta N \quad (2)$$

wherein the coefficient a1 is determined in dependence on the construction of the focus detecting device.

Then, consideration will be made about the detection of the focus deviation in the case where the change in the temperature affects the detection. If the pair of image forming lenses 10 and 12 are integrally molded of acrylic resin material as shown in FIG. 4, the distance between the lenses 10 and 12 will increase with the rise of temperature. The increase of the lens distance will then cause the increase of the distance between the images re-formed by the lenses 10 and 12 on the light receiving surface of the CCD from the primary image of an object which is at the same distance from the camera, i.e. the focus detecting device. Accordingly, the standard distance of two re-formed images for the focus determination will change with the temperature rise. Upon planning the focus detecting device, a temperature, e.g. 25° C. is determined as the standard temperature $t_S$. Let's assume that the standard image distance at the in-focus condition at the standard temperature is Ns, wherein the distance Ns is shown by the scale of the ordinal number of the comparison (which may assume a value with a decimal) which shows the highest degree of the coincidence between the standard and reference images throughout the comparing operation. The image distance will be shown hereinafter in terms of the ordinal number of comparison. It should be noted that it is easy to convert the image distance shown in this manner into a value shown in the actual distance and that the essence of the present invention does not change whether the invention is discussed and explained with either scale. As the ambinent temperature rises from the standard temperature $t_S$, the lens distance increases to increase the image distance at the time of in-focus condition from Ns and vice versa. The inventors have found through experiments that an approximately linear relationship exists between the amount of change of the image distance and the temperature. Let's define, as follows, the difference $\Delta t$ between the standard temperature $t_S$ and the actual ambient temperature $t$ at which the camera is being used:

$$\Delta t = t - t_S \qquad (3)$$

Then the amount $\Delta n$ of the change of the image distance Ns with the temperature will be given by the following formula:

$$\Delta n = a2 \cdot \Delta t \qquad (4)$$

wherein the coefficient a2 is a constant determined by experiments. As the standard image distance at the time of infocus condition at a temperature of t changes by $\Delta n$ given by the formula (4) from the standard image distance Ns at the standard temperature $t_S$, Ns+$\Delta n$ must be used in place of Ns for obtaining the amount $\Delta N'$ of deviation of the image distance at the ambient temperature t. Hence, $\Delta N'$ is defined as follows:

$$\begin{aligned} \Delta N' &= N - (Ns + \Delta n) \qquad (5a) \\ &= (N - Ns) - \Delta n \\ &= \Delta N - \Delta n \\ &= \Delta N - a2 \cdot \Delta t \qquad (5b) \end{aligned}$$

The value on both sides of the equation (5a) or (5b) is small by $\Delta n$ or $a2 \cdot \Delta t$ in comparison with the case of the formula (1). (In the temperature range where $t < t_S$, $\Delta n < 0$ holds and the values will increase.) The value $\Delta N'$ given by the formulae (5a) or (5b) represents the amount of deviation of the image distance which has been compensated for the change with the temperature. If the value $\Delta N'$ is applied to the relationship of the formula (2) to obtain the amount of the focus deviation, $$\begin{aligned} d2 &= a1 \cdot \Delta N' \qquad (6) \\ &= a1 (\Delta N - \Delta n) \\ &= a1 \cdot \Delta N - a1 \cdot \Delta n \\ &= d1 - a1 \cdot a2 \cdot \Delta t \end{aligned}$$

wherein d1 represents the amount of focus deviation when no temperature compensation is applied while d2 represents the amount of focus deviation when the temperature compensation has been applied. As seen from the formulae (5) and (6), following four ways can be employed for the temperatute compensation when the amount of deviation of the image distance is obtained:

(1) $N - a2 \cdot \Delta t$ is used in place of N
(2) $NS + a2 \cdot \Delta t$ is used in place of Ns
(3) $a2 \sqrt{\Delta t}$ is subtracted from $\Delta N$ as shown in formula (5a),
(4) $a1.22.\Delta t$ is subtracted from the result d1 of the calculation as shown by the formula (6).

FIGS. 5 through 8 show the flowcharts of the focus detectting operations carried out by a microcomputer with the temperature compensation being made in accordance with the manners ①,②,③ and④.

Now, explanation will be made about the focus detecting operation according to the present invention with reference to the flowchart shown in FIG. 5. At the outset, in step No.1, integration of charge commensurate with the amount of incident light is made at each photodiode cell in the CCD. In step No. 2, the data of the integration at each photodiodes is output in time series from CCD. The data output from the CCD include the data relating to the standard image formed above the optical axis and the reference image formed below the optical axis. The data of N is obtained in step 3 through statistical treatment of the corelation between the data of the standard and reference images. In step No.4, the tempeature dependent data $a2 \cdot \Delta t$ which changes with the temperature around the camera, is input from the temperature detecting section which will be described later on with reference to FIG. 9. As the image distance data N includes information of an amount $a2 \cdot \Delta t$ which is a function of the change of the distance between the pair of image forming lenses, with the temperature, $a2 \cdot \Delta t$ is subtracted in step No. 5 from the above mentioned data N to convert the last mentioned data to a data representing the image distance at the standard temperature. The data $\Delta N'$ representing the deviation of the image distance at the standard temperature is calculated in step No.6 from the converted data and the data Ns representing the image distance in in-focus condition at the standard temperature. Finally, the data d2 representing the focus deviation is calculated in step No. 7.

Figure 5:
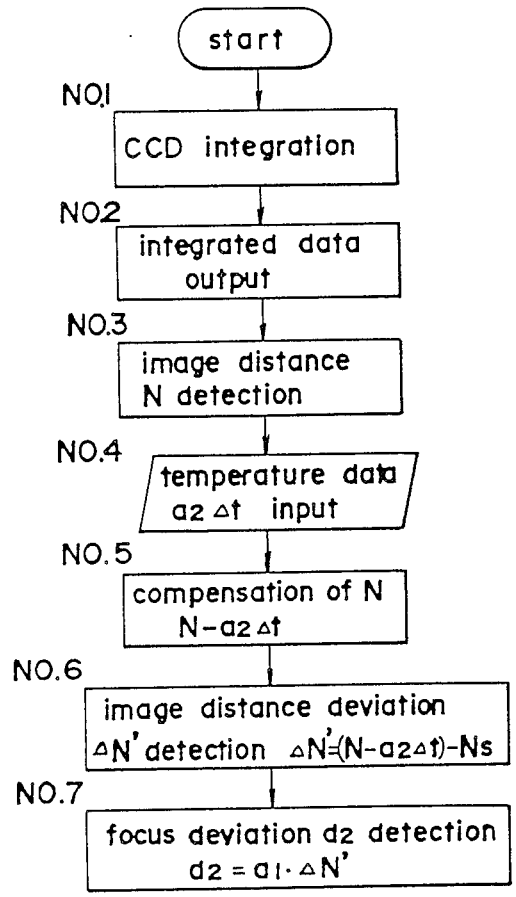
FIG. 5 is a flowchart showing an embodiment of the focus detecting operation according to the present invention.
Figure 6:
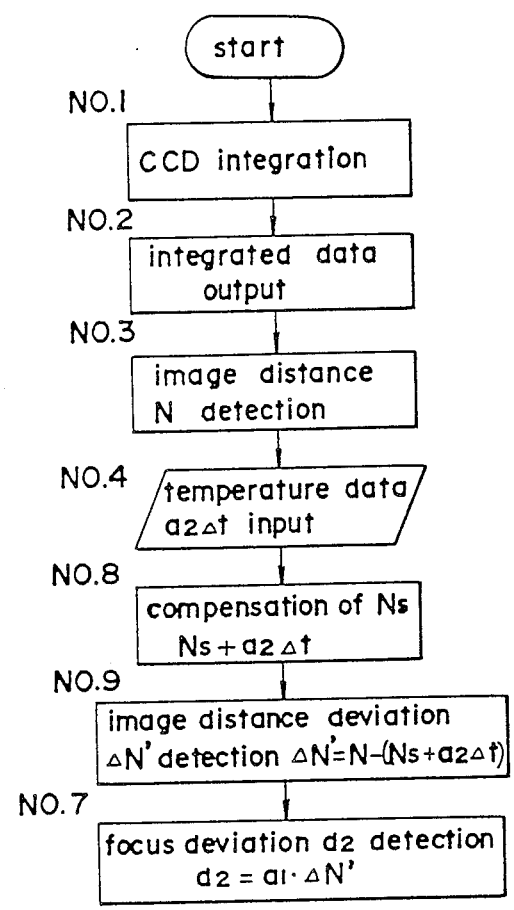
FIGS. 6 through 8 are flowcharts showing embodiments of the focus detecting operation other than that shown in FIG. 5.
Figure 7:
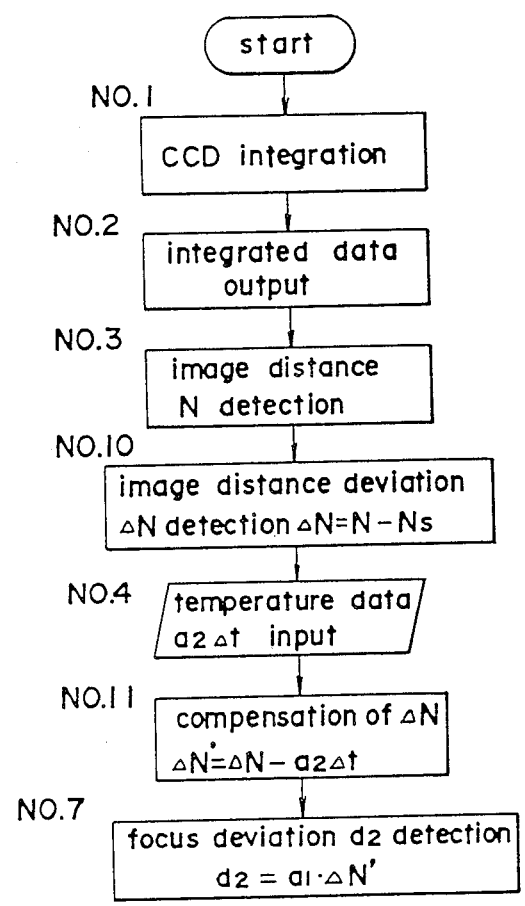
Figure 8:
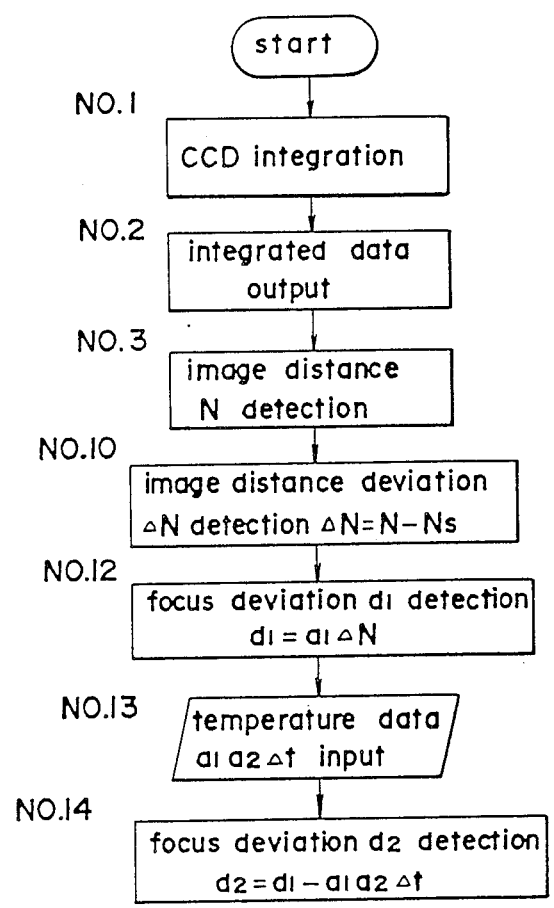

FIGS. 6, 7 and 8 show flows of the focus detecting operations wherein the temperature compensation is effected in different manners from that shown in FIG. 5. The flow shown in FIG. 6 is different from that shown in FIG. 5 in that the data Ns of the standard images distance is compensated by the temperature dependent data $a2.\Delta t$. The flow shown in FIG. 7 is different from that shown in FIG. 5 in that the image distance deviation data $\Delta N$ is compensated by the temperature dependent data $a2.\Delta t$. The flow shown in FIG. 8 is different from that shown in FIG. 5 in that the focus deviation data d1 is compensated by the temperature dependent data $a1.a2.\Delta t$. The other parts of the flows shown in FIGS. 6, 7 and 8 are substantially same as those in FIG. 5 and will not be described herein.

Figure 9:
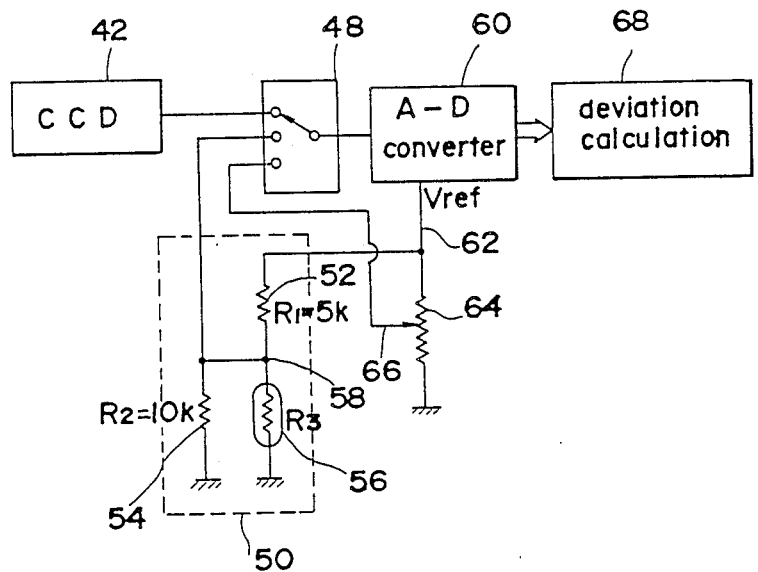
FIG. 9 is a circuit diagram showing an embodiment of the temperature detecting section of the present invention.
Figure 10:
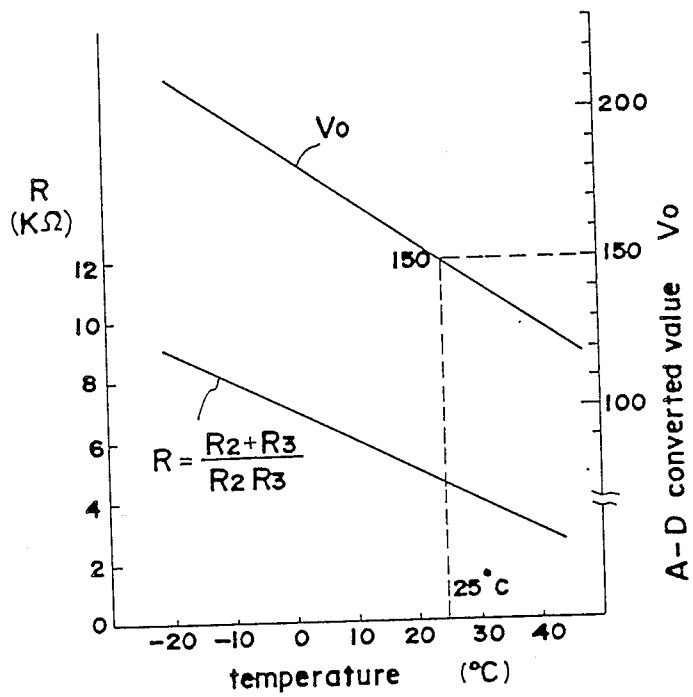
FIG. 10 is a diagram showing the temperature dependent characteristics of the output from the temperature detecting section in FIG. 9.

FIG. 9 is a block diagram showing an embodiment of the present invention. A deviation calculating section 68 effects the compensation and calculation of the amount of deviations as shown by the flowcharts in FIGS. 5 through 8. A temperature detecting circuit 50 includes resistors 52 and 54 of which resistances are independent of temperature, and a thermistor 56 of which resistance decreases as the temperature rises. The resistor 54 is connected in parallel with the thermistor 56 and their combined resistance R changes with the temperature, for example, as shown in FIG. 10. Accordingly, at the node 58 between the resistor 52 and the thermistor 56 appears a fraction of the divided voltage which linearly decreases with the temperature over the temperature range from $-20°$ C. to $+40°$ C. The fraction voltage is applied through a multiplexor 48 to an A-D converter 60 to be converted into a digital data. As the temperature detecting circuit 50 is applied with a reference voltage Vref from a terminal 62 of the A-D converter 60, the same digital value is obtained for the same temperature even if the reference voltage Vref changes due to noise or other causes. $25°$ C. is selected as the standard temperature and A-D converted value V0 at that temperature is determined to be 150, of which data is stored in the memory. If V1 represents an A-D converted value at a certain temperature, the value $\Delta V$ defined by the following formula:

$$\Delta V = V1 - V0 \quad (7)$$

is calculated and employed as the value for the compensation. The value $\Delta V$ corresponds to $-\Delta n$ in the case of compensation according to the formula 5a, to $-a2.\Delta t$ in the case of the compensation according to the formula (5b); and to $-a1.a2.\Delta t$ in the case of the compensation according to the formula (6). The circuit may be modified such that the value $\Delta V$ may be multiplied by a constant to provide a desired compensation value. When the ambient temperature is higher than $25°$ C., $\Delta V$ is negative so that the addition of $\Delta V$ to d1 in the formula (6) by way of example, practically means to subtract $|\Delta V|$ from d1.

The potentiometer 64 in FIG. 9 which does not consist a part of the invention at issue, composes means for setting the amount of compensation for the deviation of the standard value Ns from its planned value due to the scattering of the amount of errors and the like caused in the manufacture of the focus detecting device. The manner of the compensation is same as that for the change with the temperature as described above. That is, a digital value V3 for the planned value is prepared beforehand, a digital value V4 for the output from the slider 66 of the potentiometer 64 is obtained, and V4-V3 is added as the compensation to the planned value Ns. The slider 66 may be set at an appropriate position in the adjusting steps in the manfuacturing of the camera. The multiplexor 48 is controlled by a system control circuit (not shown in the FIG.) in accordance with a predetermined program to select, at a required time, the signal input to the A-D converter circuit 60.

Figure 11:
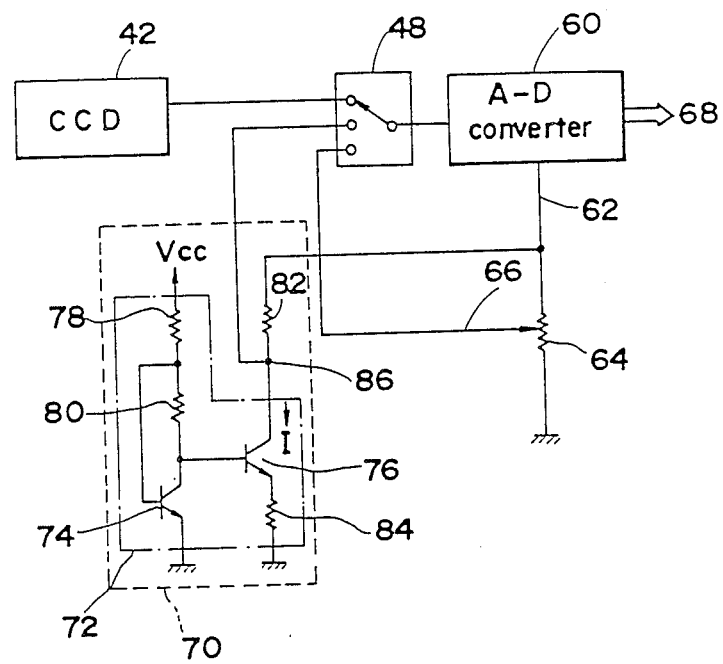
FIG. 11 is a circuit diagram showing another embodiment of the temperaturre detecting section from that shown in FIG. 9.

FIG. 11 shows the modification of the circuit shown in FIG. 9. In the circuit of FIG. 11, a temperature detecting circuit 70 is composed of transistors 74 and 76 and resistors 78, 80, 82 and 84 in place of the thermistor in FIG. 9, such that the temperature detecting circuit 70 has a construction suitable for being made into an integrated circuit. The circuit 72 surrounded by a chain-dot line serves as a constant current circuit and is known perse. If the resistors 78, 80, 82 and 84 are formed on the integrated circuit as diffused resistors, their resistances change in proportion to the absolute temperature so that the current running through the resistor 82 assures a constant value independent of temperature and the voltage across the resistor 82 will be proportional to the absolute temperature value. If the resistors 78, 80, 82 and 84 are composed of resistors having constant resistances that are independent of temperature, the current running through the resistor 82 is proportional to the absolute temperature value so that a voltage proportional to the absolute temperature will appear across the resistor 82. Thus, from the node or connecting point 86 is derived a temperature dependent voltage like as the voltage derived from the node 58 in FIG. 9.

Although the above described embodiment is arranged such that data with the value commensurate with the temperature dependent data $a2.\Delta t$ or $a1.a2.\Delta t$ is to be output from the temperature detecting section, the embodiment may be modified such that the temperature detecting section outputs data of the detected temperature t or the difference between the detected temperature and the standard temperature, and that a deviation detecting section provides the above mentioned temperature data $a2\Delta t$ or $a1.a2.\Delta t$ basing on the output value from the temperature detecting section.

While there has been described a preferred form of the invention, obviously modifications and variations are possible in light of the above teachings. It is therefore to be understood that within the scope of the appended claims, the invention may be practiced otherwise than as specifically described.

What is claimed is:

1. A focus detecting device comprising:
   means for forming images of an object;
   photo sensor array means for receiving images and generating signals representative of the positions of at least two images;
   focus deviation detecting means for detecting any focus deviation in accordance with the signals from said photo sensor array means;

temperature detecting means for detecting the ambient temperature, and compensating means for compensating, in accordance with the detected temperature, for any change of focus deviation due to temperature effects on the forming means.

2. A focus detecting device according to claim 1, wherein said photo sensor array means includes a charge coupled device.

3. A focus detecting device according to claim 1, wherein said means for forming includes a lens integrally molded of acrylic resin.

4. A focus detecting device according to claim 1, wherein said focus deviation detecting means includes image distance detecting means for detecting the distance between the pair of images in accordance with the signals from said photo sensor array means and generating distance data representing the detected image distance, fixed data generating means for generating data representing standard image distance, first calculating means for calculating and generating distance deviation data representing the deviation of the detected image distance from the standard image distance, and second calculating means for calculating and generating focus deviation data in accordance with the distance deviation data.

5. A focus detecting device according to claim 1, wherein said temperature detecting means includes a circuit for generating an electric signal of which changes with the detected temperature.

6. A focus detecting device according to claim 4, wherein said compensating means includes means for changing the detected distance data in accordance with the detected temperature.

7. A focus detecting device according to claim 4, wherein said compensating means includes means for changing the given data in accordance with the detected temperature.

8. A focus detecting device according to claim 4, wherein said compensating means includes means for changing the distance deviation data in accordance with the detected temperature.

9. A focus detecting device according to claim 4, wherein said compensating means includes means for changing the focus deviation data in accordance with the detected temperature.

10. A focus detecting device according to claim 5, wherein said circuit includes a thermistor.

11. A focus detecting device comprising;
an objective lens for forming a primary image of an object;
optical means molded of a plastic material and arranged to reform the primary image into secondary images;
photoelectric means for generating an electric signal representative of the secondary images;
means for generating a focus signal related to a focusing condition of said objective lens in accordance with the electric signal from said photoelectric means;
temperature detecting means for detecting a temperature, and
compensating means for compensating the focus signal, for any change thereof due to temperature, in accordance with the detected temperature.

* * * * *